(12) United States Patent
Hung

(10) Patent No.: US 6,896,476 B2
(45) Date of Patent: May 24, 2005

(54) FAN HAVING MAGNETIC LEVITATION BLADE ASSEMBLY

(75) Inventor: Tsung-Yung Hung, Taipei (TW)

(73) Assignees: Averatec Inc., Foothill Ranch, CA (US); Averatec Europe GmbH, Hallbergmoos (DE); Averatec Asia Incorporation, Taipei Hsien (TW)

( * ) Notice: Subject to any disclaimer, the term of this patent is extended or adjusted under 35 U.S.C. 154(b) by 20 days.

(21) Appl. No.: 10/669,981

(22) Filed: Sep. 23, 2003

(65) Prior Publication Data

US 2005/0063823 A1   Mar. 24, 2005

(51) Int. Cl.[7] ............................................. F04D 29/32

(52) U.S. Cl. ................... 415/10; 415/131; 417/423.1; 417/423.12; 417/352; 310/90.5

(58) Field of Search ........................ 415/10, 131–132, 415/173.2, 174.1; 417/423.1, 423.12, 352; 310/90.5, 152, 153, 154.01–154.49, 156.01–156.84

(56) References Cited

U.S. PATENT DOCUMENTS

| | | | | |
|---|---|---|---|---|
| 4,055,113 A | * | 10/1977 | Monroe | ................... 415/131 |
| 6,265,798 B1 | * | 7/2001 | Huang et al. | ............... 310/90.5 |
| 6,617,732 B1 | * | 9/2003 | Lin et al. | ................... 310/90.5 |
| 2003/0146668 A1 | * | 8/2003 | Sun et al. | ................... 310/90.5 |

* cited by examiner

Primary Examiner—Christopher Verdier

(57) ABSTRACT

A fan includes a casing having a bottom wall and a shaft mounted inside the casing for rotatably supporting a rotary blade assembly comprised of blades inside the casing and above the bottom wall with the blade assembly being axially movable with respect to the shaft. A levitation device includes magnets mounted to the blades of the blade assembly and a magnetic field generator mounted in the bottom wall and opposing the magnets of the blades. The magnet field generator is controlled by a control circuit to selectively generate a magnetic field that interacts with the magnets of the blades to induce expelling force acting upon the blade assembly to axially move the blade assembly a predetermined distance away from the bottom wall. The magnitude of the expelling force can be changed by controlling the magnetic field generator whereby the distance between the blades and the bottom wall can be adjusted.

2 Claims, 3 Drawing Sheets

FAN HAVING MAGNETIC LEVITATION BLADE ASSEMBLY

BACKGROUND OF THE INVENTION

1. Field of the Invention

The present invention relates generally to a fan, and in particular to a heat dissipation fan having a magnetic levitation blade assembly.

2. The Related Art

Heat dissipation fans are commonly employed to enhance removal of heat generated in computers in order to maintain proper operation of the computers. A side-mount heat dissipation fan comprises a casing having an open top for intake of surrounding air and a side opening in communication with a heat sink to conduct airflow toward and through the heat sink. The casing has a bottom that is closed for supporting a blade assembly comprised of a number of spaced blades for generating airflow during rotation. The blade assembly is maintained at a small distance above the bottom of the casing. When the blade assembly is rotated, the blades are flying very close above the bottom of the casing. Since the blade assembly is generally rotated at a high speed and since the distance between the blades and the bottom of the casing must be as small as possible, accidental impact between the blades and the bottom of the casing may occur, if the blade assembly is not properly mounted or the manufacturing tolerance is incorrect.

The present invention is thus aimed to overcome the problem of impact between the fan blades and the casing in order to enhance the overall performance of the heat dissipation fan.

SUMMARY OF THE INVENTION

An object of the present invention is to provide a fan comprising a blade assembly that is spaced from a casing by magnetic levitation whereby undesired impact between the casing and the blade assembly is eliminated.

Another object of the present invention is to provide a fan wherein a magnetic device is arranged between a casing and a blade assembly to maintain and adjust a distance between the blade assembly and the casing.

To achieve the above objects, in accordance with the present invention, there is provided a fan comprising a casing having a bottom wall and a shaft mounted inside the casing for rotatably supporting a rotary blade assembly comprised of blades inside the casing and above the bottom wall with the blade assembly being axially movable with respect to the shaft. A levitation device comprises magnets mounted to the blades of the blade assembly and a magnetic field generator mounted in the bottom wall and opposing the magnets of the blades. The magnet field generator is controlled by a control circuit to selectively generate a magnetic field that interacts with the magnets of the blades to induce expelling force acting upon the blade assembly to axially move the blade assembly a predetermined distance away from the bottom wall. The magnitude of the expelling force can be changed by controlling the magnetic field generator whereby the distance between the blades and the bottom wall can be adjusted.

BRIEF DESCRIPTION OF THE DRAWINGS

The present invention will be apparent to those skilled in the art by reading the following description of a preferred embodiment of the present invention, with reference to the attached drawings, in which.

DETAILED DESCRIPTION OF THE PREFERRED EMBODIMENT

Figure 1:
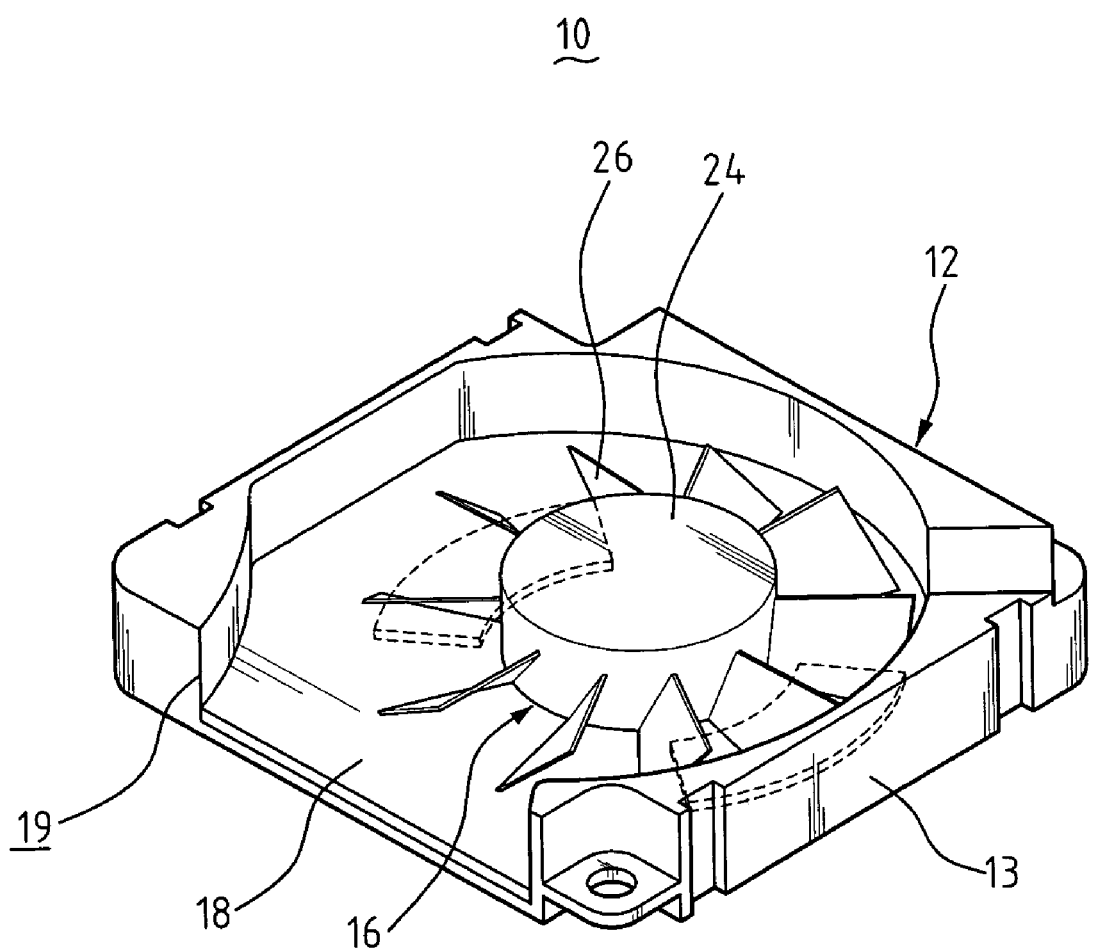
FIG. 1 is a perspective view of a fan constructed in accordance with the present invention.

With reference to the drawings and in particular to FIG. 1, a fan constructed in accordance with the present invention, generally designated with reference numeral 10, comprises a casing 12 made of a rigid material, such as metal and hard plastics. In the embodiment illustrated, the fan 10 has a side mount configuration comprising a surrounding sidewall 13 defining a cavity 14 (FIGS. 2 and 3) in which a blade assembly 16 is received. The casing 12 has a bottom wall 18 on which the fan assembly 16 is rotatably supported. The sidewall 13 extends from the bottom wall 18 and defines an open top of the casing 12. A shaft 20 (FIGS. 2 and 3) for supporting rotation of the blade assembly 16 is attached to the blade assembly 16 and has an end mounted to the bottom wall 18. The side wall 13 forms a side opening 19 through which an air flow induced by the rotation of the blade assembly 16 is guided toward a heat source (not shown).

The blade assembly 16 comprises a central hub 24 and blades 26 extending radially from the hub 24. Windings and magnets (both not shown) are arranged inside the hub 24 for driving the blade assembly 16. The blade assembly 16 is arranged to be rotatable with respect to the shaft 20 when driven by the windings and the magnets. In addition, the blade assembly 16 is axially movable with respect to the shaft 20 with a predetermined and limited stroke.

Figure 2:
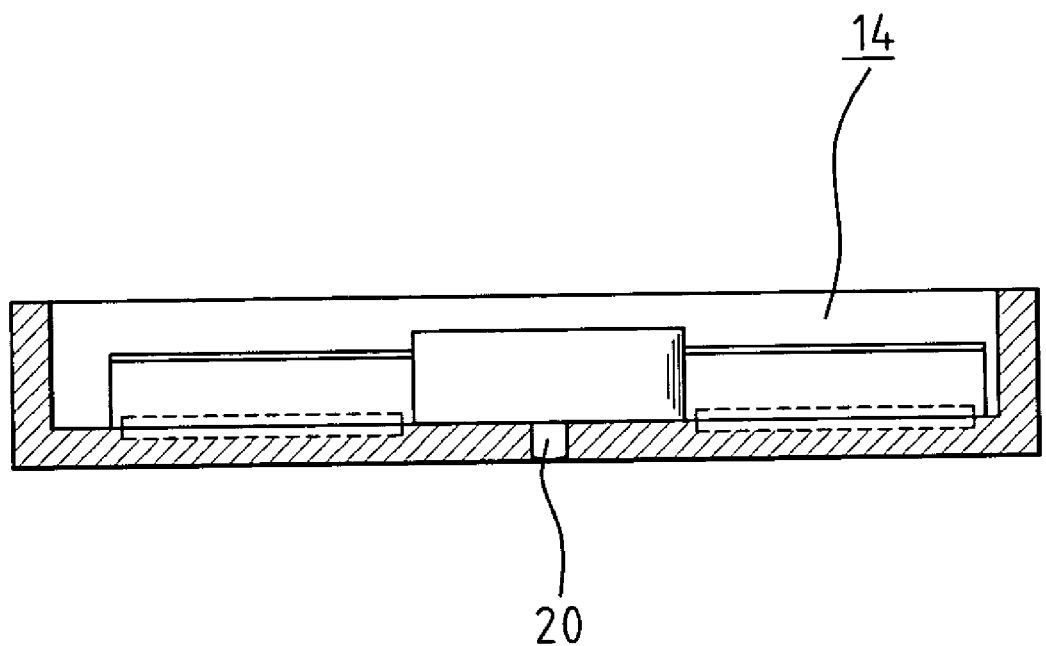
FIG. 2 is a cross-sectional view of the fan in accordance with the present invention at a non-operating condition.
Figure 3:
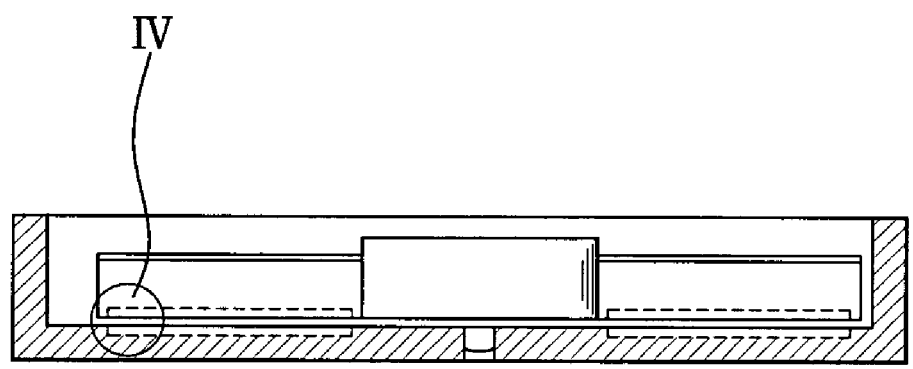
FIG. 3 is a cross-sectional view of the fan of the present invention at an operating condition.
Figure 4:
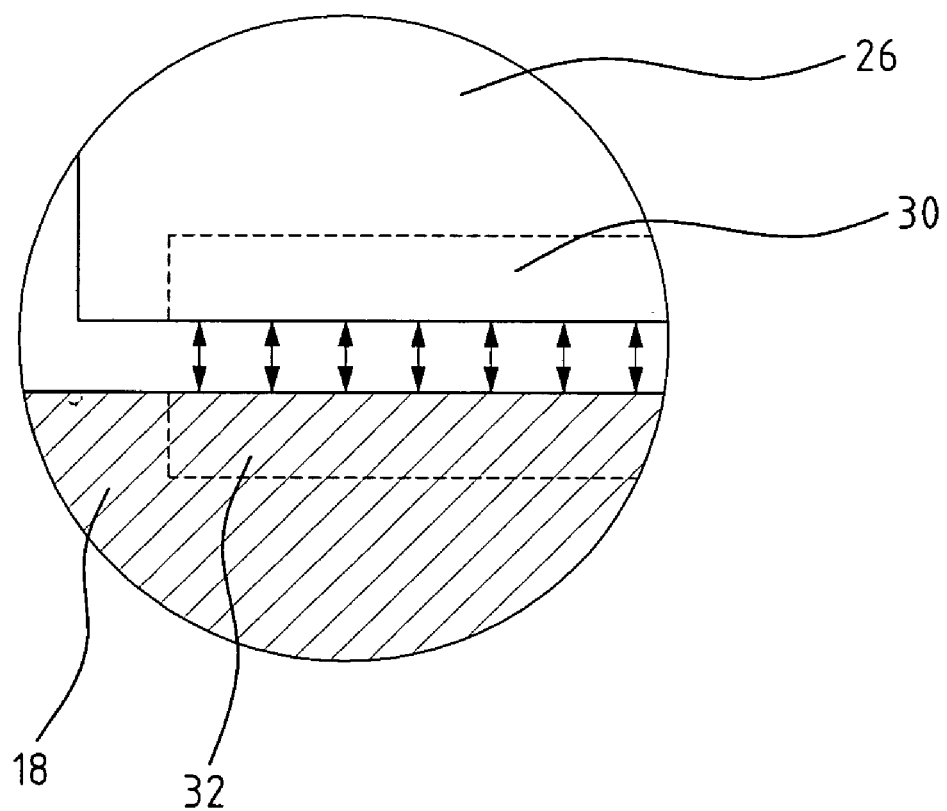
FIG. 4 is an enlarged view of encircled portion IV of FIG. 3.

Also referring to FIGS. 2–4, levitation means comprises magnets 30 mounted to the blades 26 and magnetic field generation device 32 mounted in the bottom wall 18 of the casing 13 and opposing the magnets 30 of the blades 26. The magnetic field generation device 32 is controlled by a control circuit (not shown) to generate a magnetic field (as indicated by double-headed arrows in FIG. 4) that expels the blades 26 away from the bottom wall 18 of the casing 13. Thus, when the fan 10 is not in operation and at a non-operating condition, the magnetic field generation device 32 is deactivated and no expelling field is generated, the blade assembly 16 is allowed to stay on the bottom wall 18 of the casing 13 as shown in FIG. 2. When the blade assembly 16 is about to rotate, the magnetic field generation device 32 is activated (operating condition) to generate an expelling magnetic field that interacts with the magnets 30 of the blades 26 to force the blade assembly 16 to move axially along the shaft 20 and away from the bottom wall 18. A sufficient distance is thus present between the blades 26 and the bottom wall 18, which ensures no impact between the blades 26, and the bottom wall 18.

Further, the magnetic field generation device 32 may be controlled by the control circuit to generate expelling forces of different magnitudes. This allows for adjustment of the distance between the blades 26 and the bottom 18 of the casing 13.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A fan comprising:
   a casing having a bottom wall;
   a shaft mounted inside the casing;
   a rotary blade assembly comprising blades rotatably supported by the shaft inside the casing and above the bottom wall, the blade assembly being axially movable with respect to the shaft; and
   a levitation device comprising first magnetic means mounted to the blades of the blade assembly and second magnetic means mounted in the bottom wall and opposing the first magnetic means, the second magnetic means being controllable to selectively generate a magnetic field that interacts with the first magnetic means to induce an expelling force acting upon the blade assembly for axially moving the blade assembly a predetermined distance away from the bottom wall.

2. The fan as claimed in claim 1, wherein the second magnetic means is controllable to induce expelling force of different magnitudes to adjust the distance between the blade assembly and the bottom wall.

* * * * *